(12) United States Patent
Truong et al.

(10) Patent No.: US 10,884,762 B1
(45) Date of Patent: Jan. 5, 2021

(54) METHODS AND SYSTEMS FOR COMPARING COMPUTER CONFIGURATION INFORMATION

(71) Applicant: Capital One Services, LLC, McLean, VA (US)

(72) Inventors: Anh Truong, Champaign, IL (US); Jeremy Goodsitt, Champaign, IL (US); Vincent Pham, Champaign, IL (US); Fardin Abdi Taghi Abad, Champaign, IL (US); Mark Watson, Philadelphia, PA (US); Reza Farivar, Champaign, IL (US); Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/511,601

(22) Filed: Jul. 15, 2019

(51) Int. Cl.
*G06F 9/445* (2018.01)
*G06F 11/14* (2006.01)

(52) U.S. Cl.
CPC ...... *G06F 9/44505* (2013.01); *G06F 11/1469* (2013.01); *G06F 11/142* (2013.01); *G06F 11/1402* (2013.01); *G06F 11/1446* (2013.01); *G06F 11/1451* (2013.01); *G06F 11/1458* (2013.01); *G06F 2201/84* (2013.01)

(58) Field of Classification Search
CPC .......... G06F 9/44505; G06F 2201/84; G06F 11/1469; G06F 11/1402; G06F 11/1451; G06F 11/142; G06F 11/1458; G06F 11/1446

USPC ........................................ 713/1, 100; 714/15
See application file for complete search history.

(56) References Cited

U.S. PATENT DOCUMENTS

| | | | |
|---|---|---|---|
| 7,051,327 B1 * | 5/2006 | Milius | G06F 8/65 717/168 |
| 7,698,545 B1 * | 4/2010 | Campbell | G06F 8/60 709/221 |
| 8,392,539 B1 * | 3/2013 | Chen | G06F 9/4406 709/220 |
| 8,732,662 B1 * | 5/2014 | Savant | G06F 9/451 717/120 |
| 8,990,772 B2 * | 3/2015 | Bennah | G06F 8/60 717/111 |
| 9,430,227 B2 * | 8/2016 | Verma | G06F 9/44505 |
| 10,430,179 B1 | 10/2019 | Kumar et al. | |
| 10,504,005 B1 | 12/2019 | Walters et al. | |

(Continued)

*Primary Examiner* — Ji H Bae
(74) *Attorney, Agent, or Firm* — DLA Piper LLP US

(57) ABSTRACT

Aspects of the disclosure can include a computer-implemented method for comparing computer configuration information. The computer configuration information for a computer device can be monitored using a log checker. The computer configuration information can include software configuration information and/or hardware configuration information. The computer configuration information for the computer device can be stored in a database. Current computer configuration information can be compared to previous computer configuration information of the same device and/or of clustered similar users' computer devices in order to determine a best previous computer configuration with the smallest distance from a current computer configuration. The best previous computer configuration can be applied to the computer device to fix the issue.

19 Claims, 7 Drawing Sheets

(56) References Cited

U.S. PATENT DOCUMENTS

| | | | | |
|---|---|---|---|---|
| 2004/0268106 A1* | 12/2004 | Holmberg | ................ | G06F 8/65 |
| | | | | 713/1 |
| 2008/0155534 A1* | 6/2008 | Boss | ........................ | G06F 8/61 |
| | | | | 717/178 |

* cited by examiner

Fig. 7

| date time | hardware_profile 701 | | | | | software_profile 702 | | user_profile 703 | | |
| --- | --- | --- | --- | --- | --- | --- | --- | --- | --- | --- |
| | OS_version | OS | cpu_speed | GPU? | RAM (GB) | cpu_type | packages_newlyinstalled | # applications | | |
| Combined_profile 1: 03/09/19 09:10:15 | 10.1 | mac | 2.3 | Y | 2.3 | Intel core i5 | [anaconda 1.1] | 30 | | |

| packages_updated | | programing languages | tools_used |
| --- | --- | --- | --- |
| [numpy 3.0, pandas 2.5] | | python, java | [scikit-learn, tensorflow, ...] |

| name | VID | occupation |
| --- | --- | --- |
| John Smith | 123456 | Software engineer |

METHODS AND SYSTEMS FOR COMPARING COMPUTER CONFIGURATION INFORMATION

FIELD

The present disclosure relates generally to comparing computer configuration information.

BACKGROUND

Users often have problems with software or applications on their computer devices and need assistance to address these problems. There is a need to address these problems in a more efficient manner.

SUMMARY OF THE DISCLOSURE

Aspects of the disclosure can include a computer-implemented method for comparing computer configuration information. The computer configuration information for a computer device can be monitored using a log checker. The computer configuration information can include software configuration information and/or hardware configuration information. The computer configuration information for the computer device can be stored in a database. Current computer configuration information can be compared to previous computer configuration information of the same device and/or clustered similar users' computer devices in order to determine a best previous computer configuration with the smallest distance from a current computer configuration. The best previous computer configuration can be applied to the computer device to fix the issue.

Aspects of the disclosure can include a distance algorithm used to determine distances between the current computer configuration and each previous computer configuration.

The software configuration information and/or the hardware configuration information can include: software version information, operating system information, installed package information, a date of installation, central processing unit (CPU) configuration information, cache information, graphics processing unit (GPU) configuration information, random access memory (RAM) configuration information, or date and/or time of use information, or any combination thereof.

Aspects of the disclosure can include determining a cause of a problem with the computer device using compared computer configuration information.

Aspects of the disclosure can include determining how many features of the current computer configuration are different from features in previous computer configurations.

Aspects of the disclosure can include embeddings used to reduce the number of features that are compared.

Aspects of the disclosure can include a system for comparing computer configuration information that includes a memory storing instructions, and a processor. The computer configuration information for a computer device is monitored using a log checker. The computer configuration information can include software configuration information and/or hardware configuration information. The computer configuration information for the computer device can be stored in a database. Current computer configuration information can be compared with previous computer configuration information in order to determine how the computer configuration information has changed over time. The comparing can determine how many features of the current computer configuration are different from features in the previous computer configurations. Embeddings can be used to reduce the number of features that are compared.

Aspects of the disclosure can include a distance algorithm used to determine distances between the current computer configuration and each previous computer configuration. The distance algorithm can include: a Hamming distance algorithm, a Euclidean distance algorithm, or a Levenshtein distance algorithm, or any combination thereof.

In aspects of the disclosure, non-machine learning and/or machine learning can be used to compare the distances between the current computer configuration and each previous computer configuration. The machine learning can include: decision trees, clustering, or k means, or any combination thereof. The machine learning can be used to identify new computer configurations by comparing the new computer configurations to the previous computer configurations.

Aspects of the disclosure can include a computer-implemented method for comparing computer configuration information. The computer configuration information for a user's computer device can be monitored using a log checker. The computer configuration information can include software configuration information and/or hardware configuration information. The computer configuration information for the computer device can be stored in a database. The current computer configuration information can be compared with previous computer configuration information for similar users in order to determine how to change a current computer configuration for the user's computer device.

According to aspects of the disclosure, similar users can be clustered together using configuration information. Similar users can include users who have had similar computer configuration changes or similar problems with the current computer configuration. The system can determine how similar users fixed computer configuration problems. A closest matching user can be found from the similar users.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

FIG. 7 illustrates various logged configurations for a user (e.g., u1) that can be captured by the log tracker, according to aspects of the disclosure.

The drawings are not necessarily to scale, or inclusive of all elements of a system, emphasis instead generally being placed upon illustrating the concepts, structures, and techniques sought to be protected herein.

DETAILED DESCRIPTION OF EMBODIMENTS OF THE INVENTION

Embodiments of the present disclosure may compare computer configuration information to help determine causes and/or solutions for issues with a user's computer. Users often have problems with software or applications on their computer devices and need assistance to address these problems. In some embodiments, the disclosed system can reduce processing time and privacy issues by automatically detecting computer issues and recommending solutions without requiring a technical expert to spend time reviewing the computer information and/or remotely accessing the user's computer.

Figure 1:
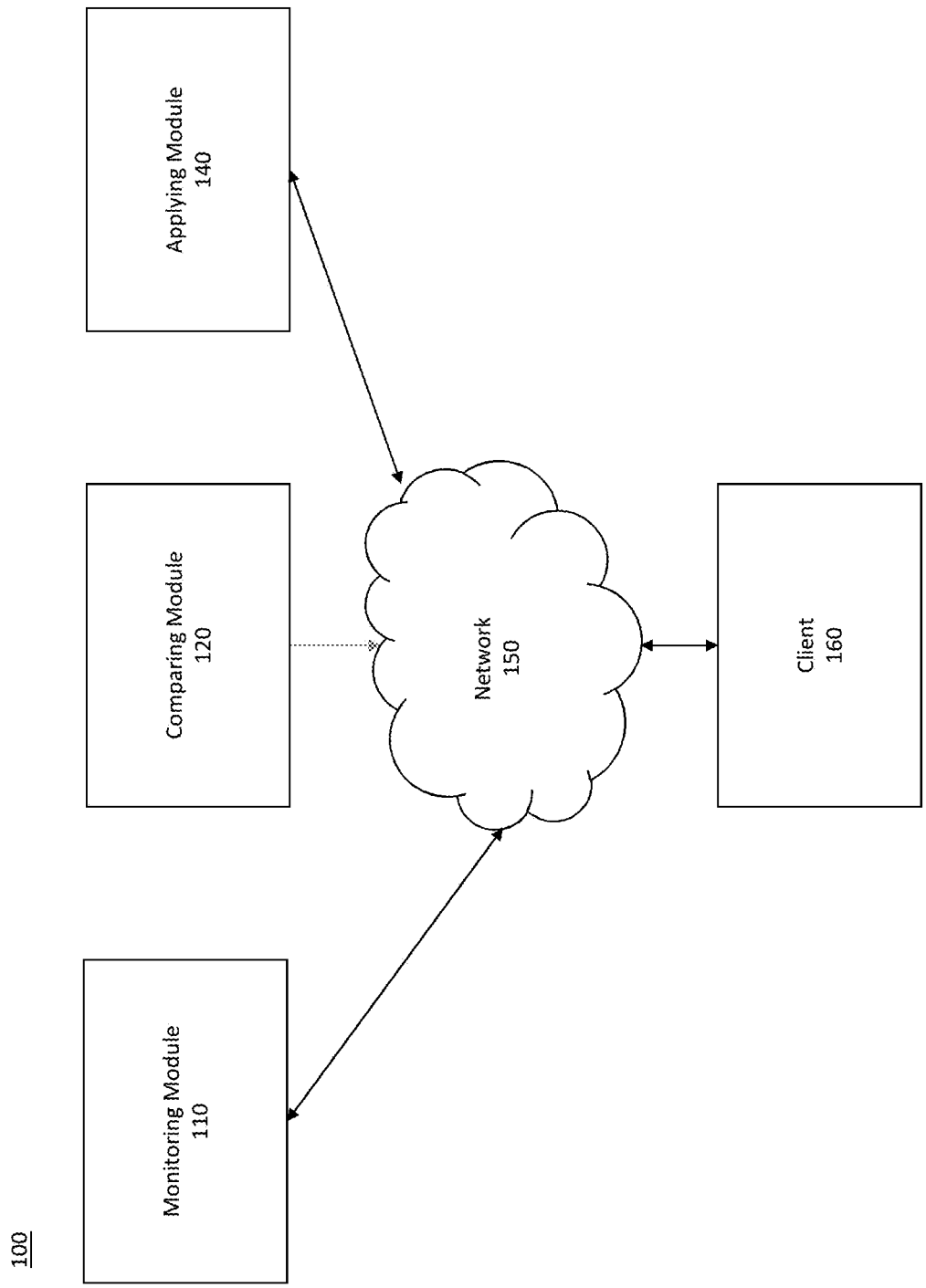
FIG. 1 is a diagram of an illustrative system 100 for comparing computer configuration information, according to some embodiments of the present disclosure.

FIG. 1 is a diagram of an illustrative system 100 for comparing computer configuration information, according to some embodiments of the present disclosure. For example, as shown in FIG. 1, a monitoring module 110 can monitor computer configuration information for a client 160 (e.g., a computer device). A comparing module 120 can compare current computer configuration information for the computer device with previous computer configuration information from the computer device or other similar computer devices to determine a best previous computer configuration for the computer device. An applying module 140 can apply the best previous computer configuration to the computer device.

Figure 2:
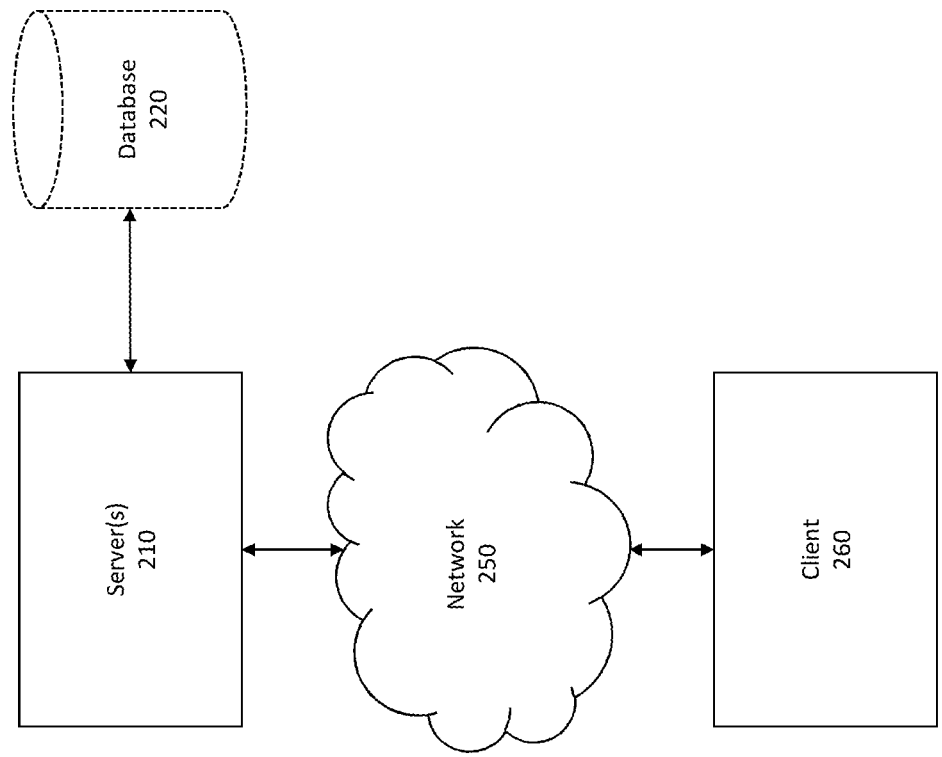
FIG. 2 is a diagram of an illustrative system 200 for comparing computer configuration information, according to some embodiments of the present disclosure.

FIG. 2 is a diagram of an illustrative system 200 for comparing computer configuration information, according to some embodiments of the present disclosure. A client 200 (e.g., a computer device) can communicate (e.g., thru a network 250) with a server 210. The server 210 can communicate with a database 220. In some embodiments, computer configuration information can be stored and/or updated in the database.

Figure 3:
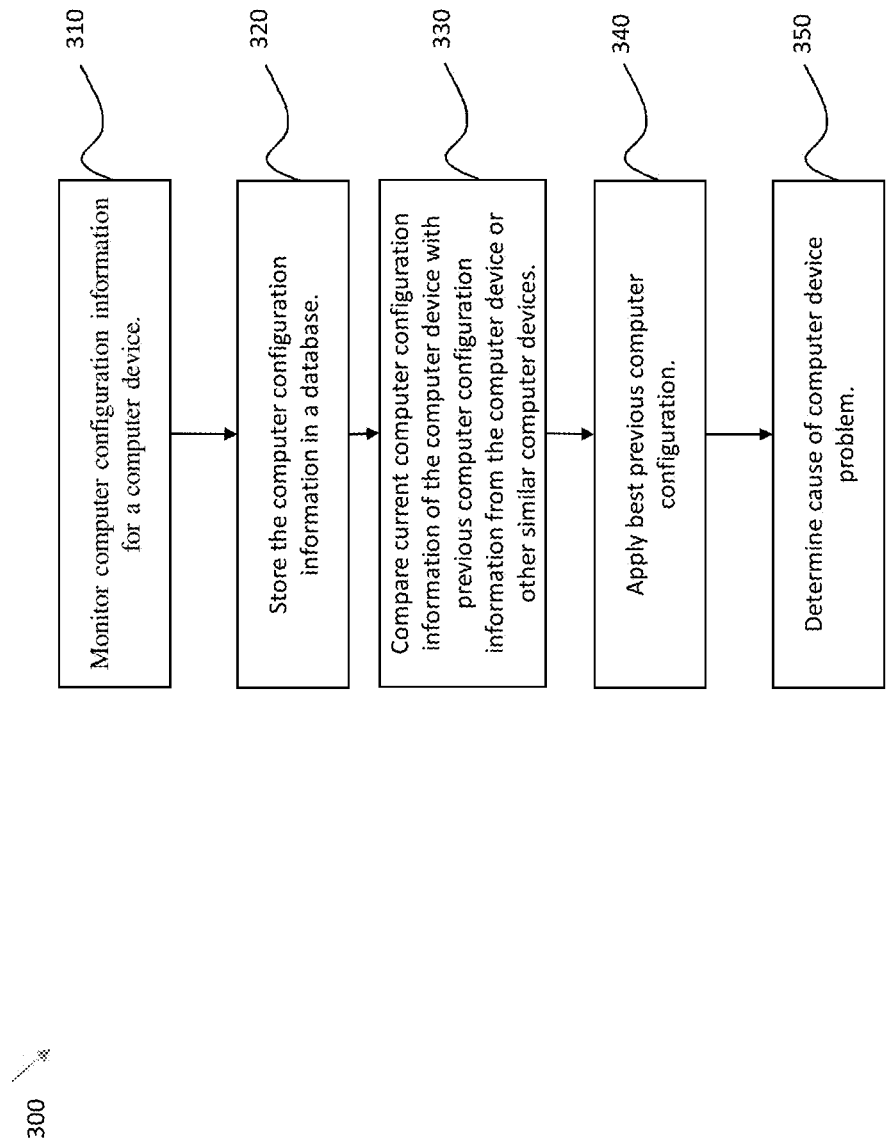
FIG. 3 is a flow diagram showing processing that may occur within the systems of FIGS. 1 and 2 to determine a cause of a computer device problem, according to some embodiments of the present disclosure.

FIG. 3 is a flow diagram showing processing that may occur within the systems of FIGS. 1 and 2 to determine a cause of a computer device problem, according to some embodiments of the present disclosure. In 310, computer configuration information for a computer device can be monitored. For example, a log checker on a user's local computer device can monitor and log information related to the normal operation of the computer device. This information can include, but is not limited to: software version information, operating system information, installed package information, a date of installation, central processing unit (CPU) configuration information, cache information, graphics processing unit (GPU) configuration information, random access memory (RAM) configuration information, or date and/or time of use information, or any combination thereof. In 320, the monitored computer configuration information can be stored in a database.

In 330, if there is a problem with the computer device, the current computer configuration information for the computer device can be compared with previous computer configuration information for the computer device and/or other similar computer devices to determine the best previous computer configuration. For example, in some embodiments, multiple previous computer configurations of the user's computer device can be compared to the current computer configuration that is causing a problem, and one of the previous computer configurations can be chosen as the best previous computer configuration (e.g., the optimum restore point). In other embodiments, either instead of or in addition to reviewing previous computer configurations of the user's computer device, log information can be sent to the server where other users can be clustered according to their configuration information (e.g., parameters). The user's log information can be compared to the other users' log information to determine which cluster is most appropriate for the user (e.g., which previous computer configurations for the other users are similar to the current (problematic) computer configuration of the user's computer device.) A previous solution (e.g., configuration) that worked for the other similar users can be identified and recommended for the user's computer device. If there isn't an identified previous solution that worked for the other similar users, the system can recommend that the user change to a configuration that is currently working for the other similar users.

In 340, the best previous computer configuration can be applied. In 350, the applied best previous computer configuration can be used to address the computer device problem.

Figure 4:
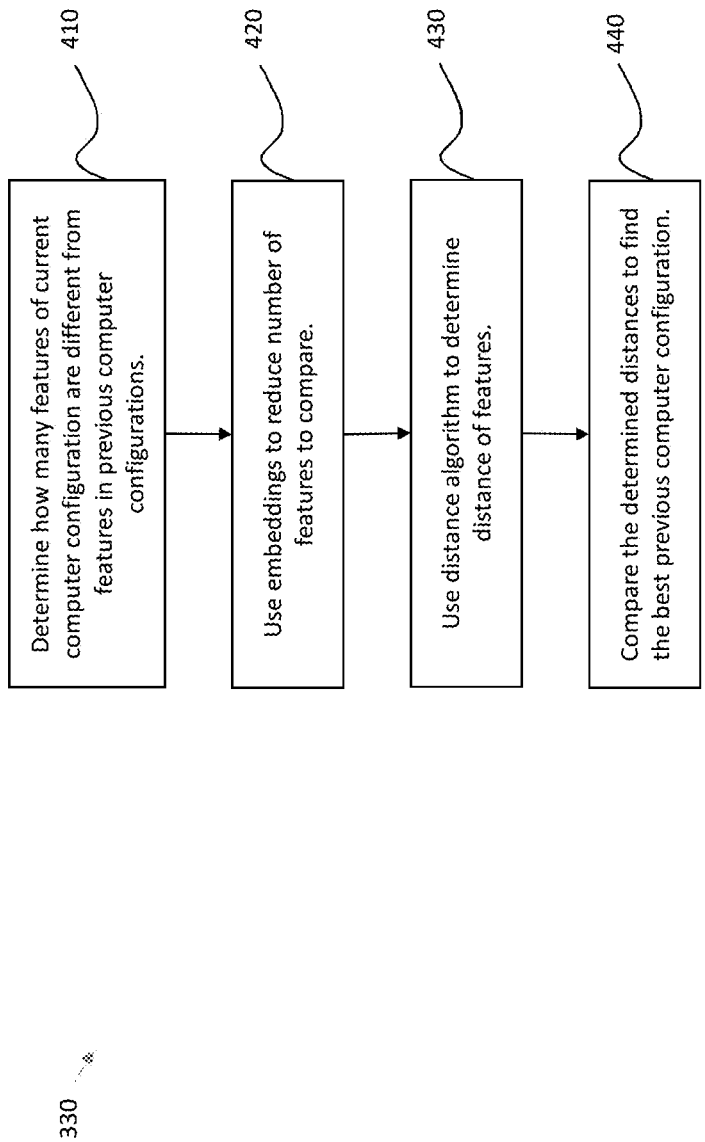
FIG. 4 is a flow diagram showing processing that may occur within the systems of FIGS. 1 and 2 to compare the determined distances to find the best previous computer configuration, according to some embodiments of the present disclosure.

FIG. 4 is a flow diagram showing processing that may occur within the systems of FIGS. 1 and 2 to compare the determined distances to find the best previous computer configuration (e.g., 330 of FIG. 3), according to some embodiments of the present disclosure. In 410, the system can determine how many features of the current computer configuration are different from features of the previous computer configurations. In 420, embeddings can be used to reduce the number of features in the profiles to compare in order to apply a distance measurement more efficiently. In 430, a distance algorithm can be used to determine the distance of the features. In 440, the determined distances can be compared to find the best previous computer configuration.

Figure 6:
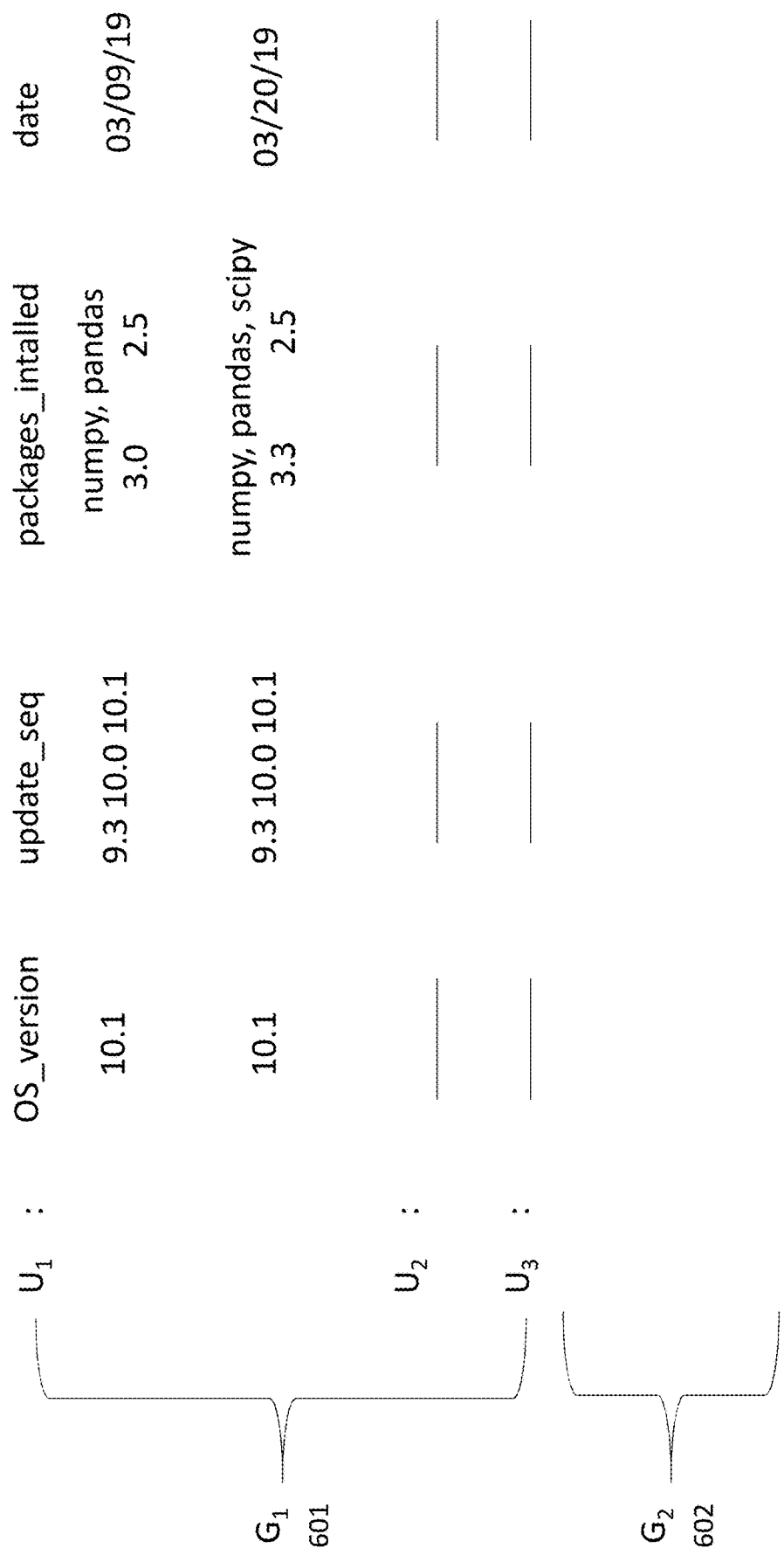
FIG. 6 illustrates an example hardware profile, software profile and user profile, according to aspects of the disclosure.

FIG. 6 illustrates an example hardware profile, software profile and user profile, according to aspects of the disclosure. The example hardware profile includes a date/time the log checker logs the configuration, an operating system (OS) version, the type of OS, the CPU speed, whether the device uses GPU, how much RAM the device has, and the CPU type. The example software profile includes the updated package information (e.g., including name, version, installation date), the newly installed package information, and the number of applications. The user profile includes the name of the user, the user ID, the occupation of the user, the programming language of the user, and the tools used.

FIG. 7 illustrates various logged configurations for a user (e.g., u1) that can be captured by the log tracker, according to aspects of the disclosure. For example, the OS version, the update sequence, the packages installed with their versions, and date information can be captured by the log tracker for two different dates in this example.

EXAMPLE EMBODIMENTS

For example, all configuration details related to the versions of software and associated packages used for a user's computer device can be pulled by a log checker. The log checker can log all information about the current state of the system and/or software: OS version, package install, date of installation, CPU speed and/or configuration, memory capacity, frequency of cache, using GPU or not, using RAM memory or not, date/time of use for each use, etc.

When the user has an issue, the system can compare the current configuration with previous configurations to determine what has changed since the most recent working configuration(s). Thus, for example, if there is a problem with how the computer device is running, the current configuration can be compared to yesterday's configuration and it can be discovered that the software package version has changed.

In some embodiments, the system can compare the current configuration with multiple previous configurations of the user's computer device to determine which previous configuration has the least changes as compared to the current configuration. In this way, the system can find the previous configuration that is the closest distance to the current configuration.

If the system cannot find a previous working configuration that fixes the problem, it can compare the user's current configuration with profiles of other similar users (e.g., clustered together) to determine if there is a recent working configuration of another similar user or a cluster of similar users that will fix the problem. In addition to fixing a particular problem, this comparing can be used to install a software patch (e.g., to fix a bug) or a security patch (e.g., to fix a security issue). For example, an example for bug fix can be a library that works well on a Mac OS, with Tensorflow 1.13, but doesn't work on a low version of Linux (e.g., Ubuntu 16.04). In this case, the system may recommend that we downgrade the Tensorflow version to 1.12 or 1.10 to be used with a Linux environment.

In this way, the user's current profile can be compared with the profile of a similar user or a cluster of profiles of similar users in order to determine the best closest working configuration that requires the fewest changes and provides the software patch or security patch. Similarly, the user's current profile can be compared with the profile of a similar user or a cluster of profiles of similar users in order to determine which user preferences are closest to the user's preferences. In this way, any change to the system can be done in a way that is likely to be most preferred by the user.

The system can determine which similar user profile or cluster of similar user profiles is the closest to the user's profile by checking how many different features the profiles have. In some embodiments, the Hamming distance can determine how many different non-numerical features the two profiles have and/or the Euclidean distance can be used to determine the integer distance. In some embodiments, the Hamming distance determines if the profiles are different, and then the Euclidean distance is used to determine how different the profiles are.

For example, if a user used a particular code for an on-line cloud service yesterday, but then used the same code on his computer today, the code might not work on the computer today because the code version has changed and/or the computer has a different memory capacity. Thus, if the current user profile is a 3.3 software version with 4 gigabytes of RAM, it can be compared with the following two recent profiles: profile 1 (a 3.3 software version with 8 gigabytes of RAM) and profile 2 (a 3.0 software version with 8 gigabytes of RAM). Thus, the distance between the current profile and profile 1 is less than the distance between the current profile and profile 2.

Of course, when dealing with complicated configuration profiles, multiple types of distance metrics may be used. In some embodiments, a distance algorithm (e.g., a Hamming distance algorithm, a Euclidean distance algorithm, or a Levenshtein distance algorithm, or any combination thereof) can be used to determine distances between the current computer configuration and each previous computer configuration. In addition, in some embodiments, non-machine learning and/or machine learning is used to compare the distances between the current computer configuration and each previous computer configuration. The machine learning can include: decision trees, clustering, or k means, or any combination thereof.

Computer Configuration

Methods described herein may represent processing that occurs within a system for managing a configuration of an application (e.g., system 100 of FIG. 1). The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors (e.g., processor 510 in FIG. 5) executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Figure 5:
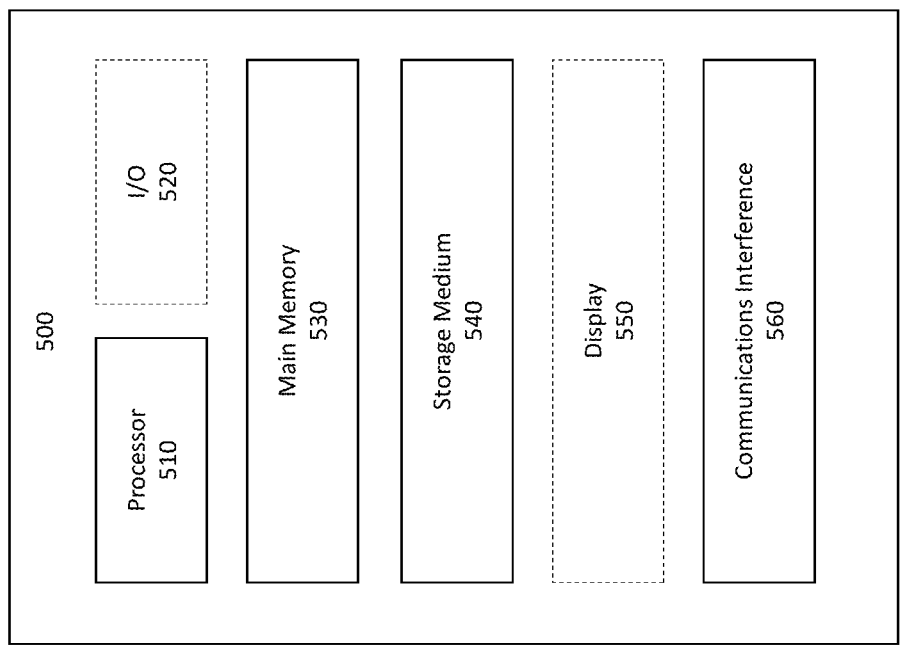
FIG. 5 illustrates an example computer 505, according to some embodiments of the present disclosure.

FIG. 5 illustrates an example computer 505, according to some embodiments of the present disclosure. Computer 505 can include a processor 510 suitable for the execution of a computer program, and can include, by way of example, both general and special purpose microprocessors, and any one or more processor of any kind of digital computer. A processor can receive instructions and data from a memory 530 (e.g., a read only memory or a random access memory or both). Processor 510 can execute instructions and the memory 530 can store instructions and data. A computer can include, or be operatively coupled to receive data from or transfer data to, or both, a storage medium 540 for storing data (e.g., magnetic, magneto optical disks, or optical disks). Information carriers suitable for embodying computer program instructions and data can include all forms of non-volatile memory, including by way of example semiconductor memory devices, such as EPROM, EEPROM, flash memory device, or magnetic disks. The processor 510 and the memory 530 can be supplemented by, or incorporated in, special purpose logic circuitry.

The computer 505 can also include an input/output 520, a display 550, and a communications interface 560.

CONCLUSION

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Accordingly, other implementations are within the scope of the following claims. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

In addition, it should be understood that any figures which highlight the functionality and advantages are presented for example purposes only. The disclosed methodology and system are each sufficiently flexible and configurable such that they may be utilized in ways other than that shown. For example, other steps may be provided, or steps may be eliminated, from the described flows, and other components may be added to, or removed from, the described systems. In addition, the steps or components may be used in a different order or configuration than that shown in the drawings.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer-implemented method for comparing computer configuration information, comprising:
    monitoring the computer configuration information for a user's computer device using a log checker, the computer configuration information comprising software configuration information and/or hardware configuration information;
    storing the computer configuration information for the user's computer device in a database; and
    comparing current computer configuration information for the user's computer device with previous computer configuration information of clustered users' computer devices in order to determine a best previous computer configuration wherein the best previous computer configuration is a previous configuration that worked for a clustered user and has a smallest algorithmic distance from the current computer configuration information.

2. The method of claim 1, wherein a distance algorithm is used to determine distances between the current computer configuration and each previous computer configuration.

3. The method of claim 1, wherein the software configuration information and/or the hardware configuration information comprises: software version information, operating system information, installed package information, a date of installation, central processing unit (CPU) configuration information, cache information, graphics processing unit (GPU) configuration information, random access memory (RAM) configuration information, or date and/or time of use information, or any combination thereof.

4. The method of claim 1, comprising:
    determining a cause of a problem with the computer device using compared computer configuration information.

5. The method of claim 1, wherein comparing the current configuration information comprises determining how many features of the current computer configuration are different from features in previous computer configurations.

6. The method of claim 5, wherein the best previous computer configuration is a working configuration for a clustered user that requires the fewest changes compared to the user's current configuration.

7. A system for comparing computer configuration information, comprising:
    a memory storing instructions; and
    a processor that, when executing the instructions, is configured to:
    monitor the computer configuration information for a computer device using a log checker, the computer configuration information comprising software configuration information and/or hardware configuration information;
    store the computer configuration information for the computer device in a database;
    compare current computer configuration information with previous computer configuration information of clustered users' computer devices in order to determine how the computer configuration information has changed over time, wherein the comparing determines how many features of the current computer configuration are different from features in the previous computer configurations; and
    apply a best previous computer configuration to the computer device, wherein the best previous computer configuration is a previous configuration that worked for a clustered user and has a smallest algorithmic distance from the current computer configuration information.

8. The system of claim 7, wherein a distance algorithm is used to determine distances between the current computer configuration and each previous computer configuration.

9. The system of claim 8, wherein the distance algorithm comprises: a Hamming distance algorithm, a Euclidean distance algorithm, or a Levenshtein distance algorithm, or any combination thereof.

10. The system of claim 8, wherein non-machine learning and/or machine learning is used to compare the distances between the current computer configuration and each previous computer configuration.

11. The system of claim 10, wherein the machine learning comprises: decision trees, clustering, or k means, or any combination thereof.

12. The system of claim 10, wherein the machine learning is used to identify new computer configurations by comparing the new computer configurations to the previous computer configurations.

13. A computer-implemented method for comparing computer configuration information, comprising:
monitoring the computer configuration information for a user's computer device using a log checker, the computer configuration information comprising software configuration information and/or hardware configuration information;
storing the computer configuration information for the computer device in a database;
comparing the current computer configuration information with previous computer configuration information for clustered users in order to determine how to change a current computer configuration for the user's computer device; and
applying a best previous computer configuration to the computer device, wherein the best previous computer configuration is a previous configuration that worked for a clustered user and has a smallest algorithmic distance from the current computer configuration information.

14. The method of claim 13, comprising:
determining how clustered users fixed computer configuration problems.

15. The method of claim 13, comprising:
finding a closest matching user from the users.

16. The method of claim 13, wherein comparing the current configuration information comprises determining how many features of the current computer configuration are different from features in previous computer configurations.

17. The method of claim 16, wherein the number of features that are compared is reduced.

18. The method of claim 13, wherein a distance algorithm is used to determine distances between the current computer configuration and each clustered user's previous computer configuration.

19. The method of claim 18, wherein non-machine learning and/or machine learning is used to compare the distances between the current computer configuration and each clustered user's previous computer configuration.

* * * * *